UNITED STATES PATENT OFFICE.

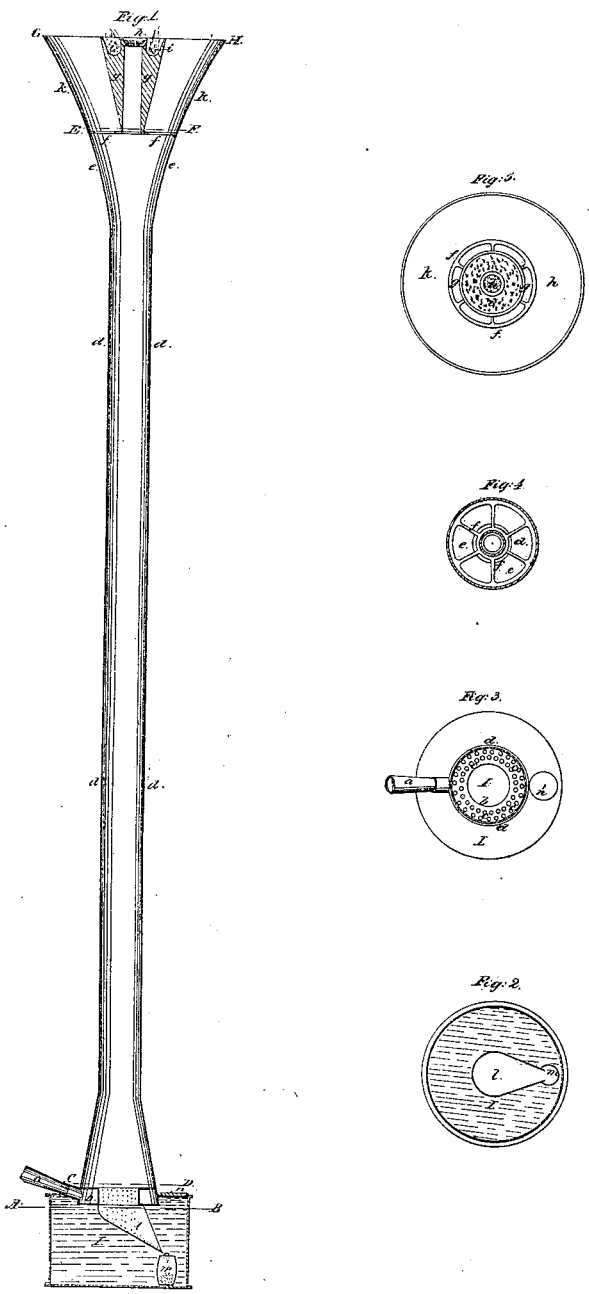
D. Smith,
Making Shot.
Nº 6,460.
Patented May 22, 1849.

DAVID SMITH, OF NEW YORK, N. Y.

IMPROVED METHOD OF MANUFACTURING DROP-SHOT.

Specification forming part of Letters Patent No. 6,460, dated May 22, 1849.

*To all whom it may concern:*

Be it known that I, DAVID SMITH, of the city and county of New York, manufacturer of lead pipe, &c., have invented and made certain new and useful Improvements in the Means or Mode of Manufacturing Drop-Shot, the main feature of which (my said invention) consists in causing the fused metal to fall through an ascending current of air, which shall travel at such a velocity that the dropping metal shall come in contact with the same number or more particles of air in a short tower than it would in falling through the high towers heretofore found necessary to such purposes, such mode effecting the manufacture of shot with less outlay and current expense, and producing shot of better quality than the ordinary means now in use, for which improvements I seek Letters Patent of the United States; and I do hereby declare that the mode of using the said improvements is fully and substantially set forth and shown in the following description, and in the drawings annexed to and making part of this specification, wherein—

Figure 1 is a vertical sectional elevation of a sheet-metal cylinder set up as a tower within a building, and may be of about twenty inches internal diameter to each fifty feet of height, or nearly in such proportions for other heights. Fig. 2 is a plan at the line A B of Fig. 1. Fig. 3 is a plan at the line C D of Fig. 1. Fig. 4 is a plan at the line E F, Fig. 1, and Fig. 5 is a plan at the line G H of Fig. 1, the similar letters used as marks of reference applying to the like parts in all the figures.

In these, I is a water-cistern beneath the tower. $a$ is a pipe from any competent blowing apparatus, leading into a hollow annular ring-chamber, $b$, the bottom of which is to be supported in any proper manner above the cistern I. The inner face forms a portion of the passage for the descending shot. The upper face, $c$, is fitted with holes, as shown in plan, Fig. 3, to pass and disperse the entering and ascending air, and the outer side of the ring $b$ forms the base of a truncated cone that sustains a metal cylindrical tower. $d\,d$, which, at $e\,e$, spreads to pass the ascending blast through a frame, $f\,f$. This is shown in plan, Fig. 4, and in Fig. 1 is shown as sustaining a cylindrical standard, $g$, the upper central portion of which receives the pouring-pan $h$. This is made changeable for each separate size of shot, to be made by larger or smaller holes through the bottoms of the successive pans, as usual, and round the pouring-pan $h$ is a circular waste-trough, $i$. Around these parts the tower $d\,d$ finishes as a trumpet-mouth, $k\,k$. The intent and effect of this arrangement is that the fluid metal, running through the pouring-pan $h$ into the ascending current of air, in a tower of fifty feet high, when the air is passing up with twice the velocity of the descending metal, will be operated on to the same or to a greater extent by the air as if it fell through the stagnant air in a costly tower of one hundred and fifty feet or more high, and in the like proportions with greater or less velocities of the ascending current of air. The particles of metal fall through the open center of the ring $b$ into the water in the cistern I, where, for convenience, a chute, $l$, Figs. 1 and 2, carries the particles of metal into a tub, $m$, which may be placed empty and removed when full through a scuttle, $n$, in the cover of the cistern.

I do not intend hereby to confine myself to the proportions of the parts herein described and shown, nor do I intend to confine myself to the parallel cylindrical form of the tower $d\,d\,k\,k$, as this may be made more or less conical, and the other parts may be varied in any way that is substantially the same in the means employed to produce the like and intended effects.

What I claim as new, and desire to secure by Letters Patent of the United States, is—

The application of an ascending artificial current of air to cool the descending metal in the manufacture of drop-shot.

In witness whereof I have hereunto set my hand this 12th day of February, 1849.

DAVID SMITH.

Witnesses:
   W. SERRELL,
   LEMUEL W. SERRELL.